Figure 4:
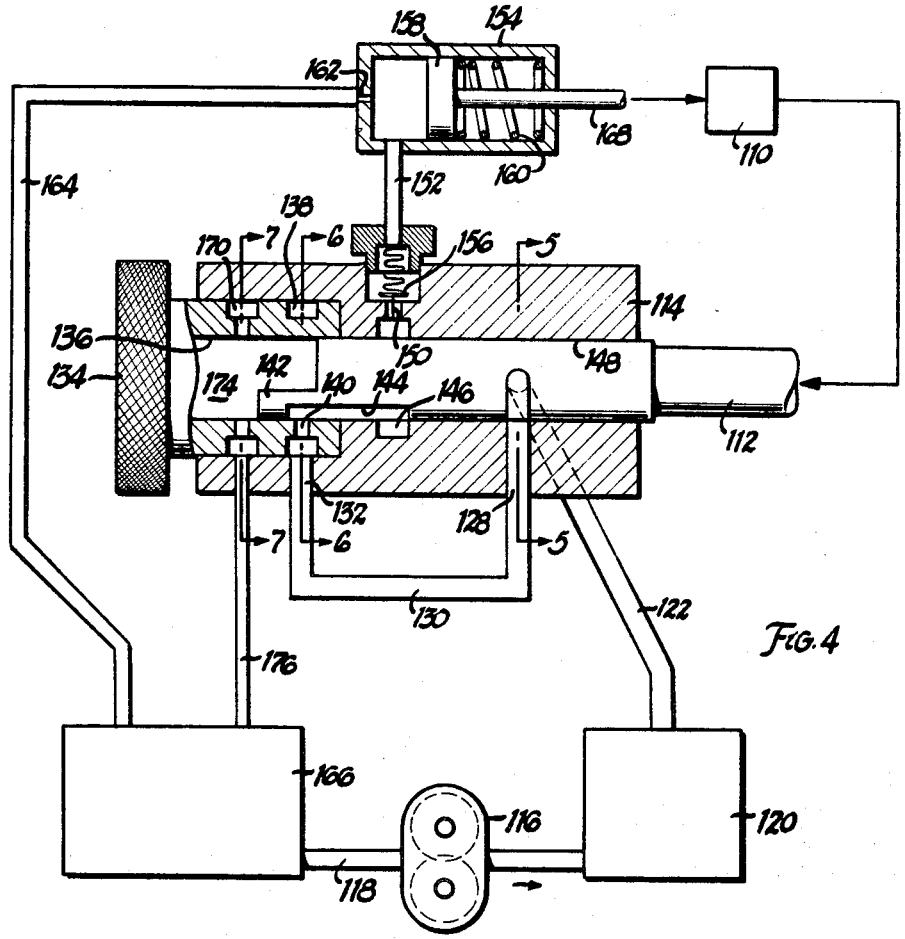

Aug. 6, 1968 G. D. WOLFF 3,395,718
SPEED SENSING METHOD AND APPARATUS
Filed March 22, 1966 2 Sheets-Sheet 1
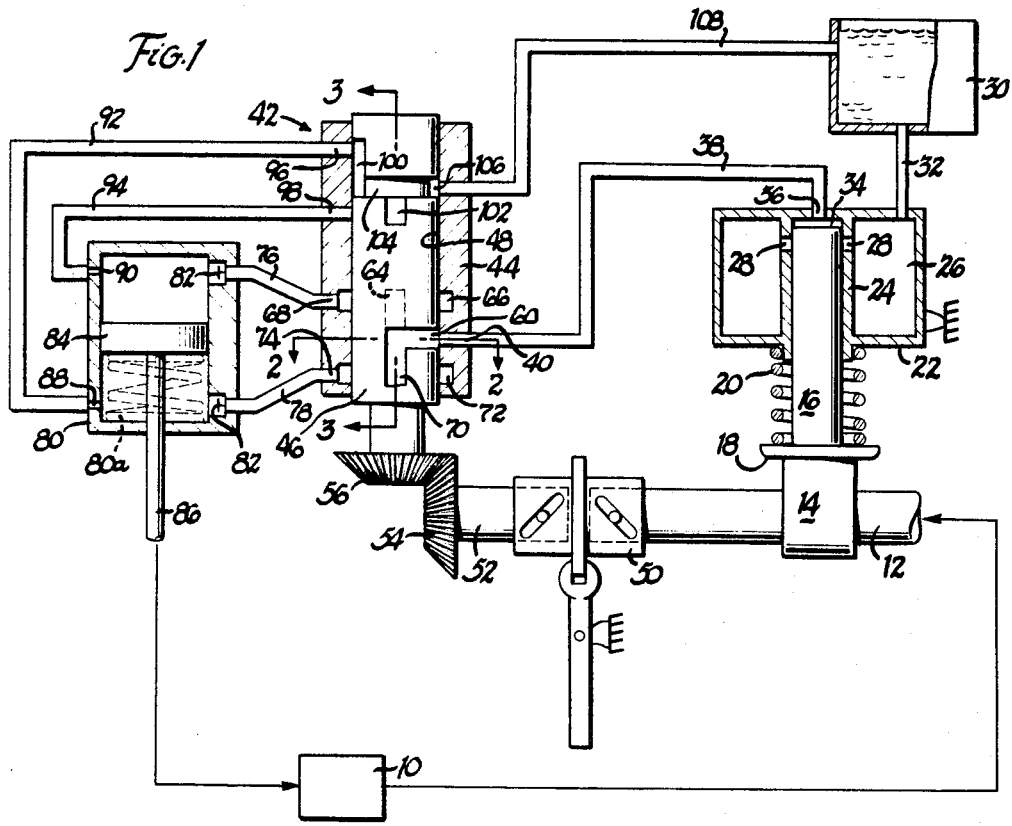
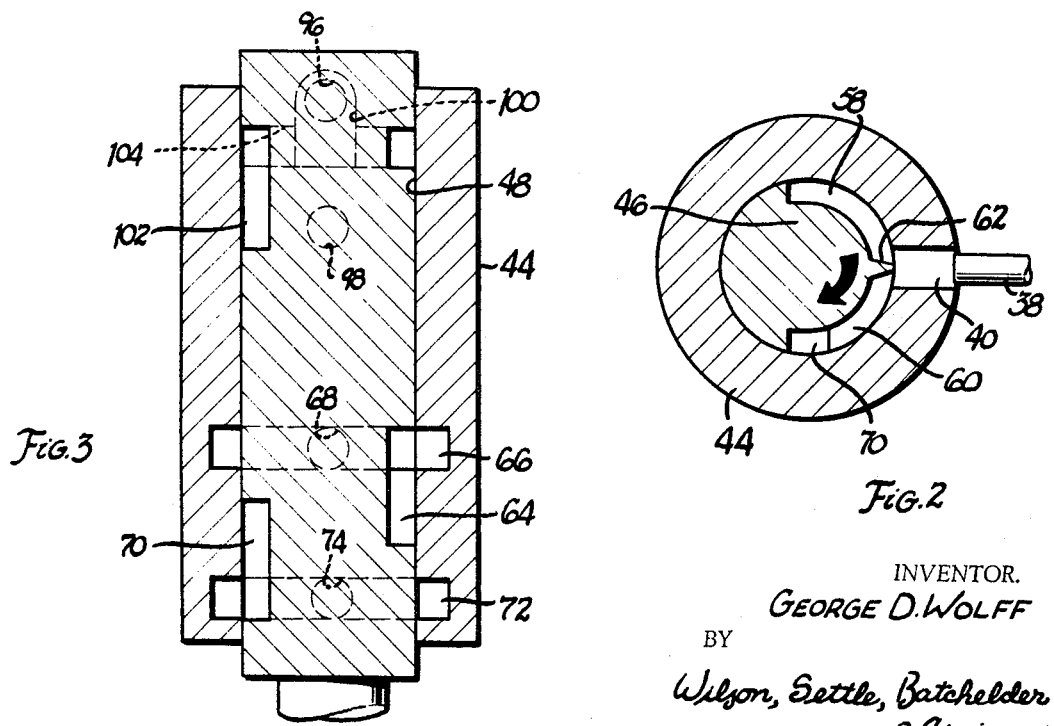
INVENTOR.
GEORGE D. WOLFF
BY
Wilson, Settle, Batchelder
Attys. & Craig Aug. 6, 1968     G. D. WOLFF     3,395,718

SPEED SENSING METHOD AND APPARATUS

Filed March 22, 1966     2 Sheets-Sheet 2

INVENTOR.
GEORGE D. WOLFF
BY
Wilson, Settle, Batchelder
          ATT'YS.   & Craig

United States Patent Office 3,395,718
Patented Aug. 6, 1968

3,395,718
SPEED SENSING METHOD AND APPARATUS
George D. Wolff, 22565 Statler Blvd.,
St. Clair Shores, Mich. 48081
Filed Mar. 22, 1966, Ser. No. 536,400
12 Claims. (Cl. 137—12)

The invention relates to speed sensing and control devices, and more particularly to speed sensing and governing devices employed in conjunction with controls for variable speed power-driven rotary shafts in the form of governors, speed or load control devices and the like.

There are essentially three different types of governors known for controlling the speed of power driven rotary shafts. The oldest and most widely used ones are of the mechanical flyweight type where the centrifugal force of rotatively mounted weights is counterbalanced by a spring force and the difference between the forces is used to affect the necessary control linkage movement. The main disadvantage of this type of governor is the low force available for the control movements or low work capacity. This low work capacity is especially pronounced at low speeds since the flyweight forces decreases with the square of the rotational speed. The low work capacity frequently results in oscillation or hunting which is due to the time lag between the occurrence of the speed change and the corrective action. The governor cannot react before enough work capacity due to the speed change is available to overcome the resisting forces of friction and inertia.

A second type of governor—the hydraulic flyweight type governor—avoids the deficiency of low work capacity by using the flyweights for speed sensing and actuation of a servo-mechanism only, the servo-mechanism then being the source of the work capacity required to move the controls. The main disadvantage of this type of governor is its complexity due to the addition of a servo-mechanism and the necessity to incorporate damping or feedback means. These means again are needed in order to avoid oscillations due to the time lag between the sensing of the speed change and the corrective action. Sufficiently short reaction time often is difficult to achieve because the servo-mechanism has to be activated first before a control movement can take place.

A third type of known governor senses in one way or the other speed related changes in the velocity or pressure of a flowing medium such as air in the intake manifold of an internal combustion engine, the pressure difference then being utilized to affect the control movement. Besides other well known disadvantages again the reaction time is a problem because of the time lag between the speed change and the change in the flow velocity or the pressure.

It is a major object of my invention to provide a governor with high work capacity, extremely short reaction time and inherent stability. It is another object of my invention to provide a speed sensing and governing device of utmost simplicity with no moving masses and linkages in the actual sensing and control parts.

It is another object of my invention to provide methods and apparatus for accurately sensing and controlling variations in the speed of rotation of rotary shafts.

It is another object of the invention to provide methods and apparatus for generating a precisely regulated fluid pressure signal representative of the speed of rotation of a rotary shaft.

Still another object of the invention is to provide a speed sensing system in which fluid pressure signals proportional to shaft speed are accurately generated and regulated without the use of complex mechanical parts or mechanisms. The foregoing, and other objects, are achieved in a speed sensing system in which a series of fluid pressure pulses are generated at a frequency proportional to the rotary speed of the shaft to be controlled. The pulses are conducted through a delay conduit of a finite length such that an essentially constant time proportional to this length is required for a pressure pulse to completely traverse the delay line. At the outlet end of the delay line, the transmitted pressure pulse is divided or split by a valving arrangement driven in cyclic movement synchronized with the rotary speed of the shaft. Variations in the speed of the shaft vary the cyclic phase relationship between the time of arrival of the pulse and the relative position of the pulse dividing means at that time. A control device is connected to the pulse dividing means and the divided pulse is employed as a signal to position the control device in accordance with the particular proportion into which the pulse is divided.

The particular systems described in detail below are particularly well adapted, although not limited, to, the control of internal combustion engines, such as diesel motors, as, for example to maintain a constant engine speed in the face of a varying load applied to the engine. However, in its broader aspects, the invention can be employed in almost any environment to generate a fluid pressure signal which is accurately and precisely regulated to serve as a shaft speed or speed change indicating signal.

Other objects and features of the invention will become apparent by reference to the following specification and to the drawings.

Figure 5:
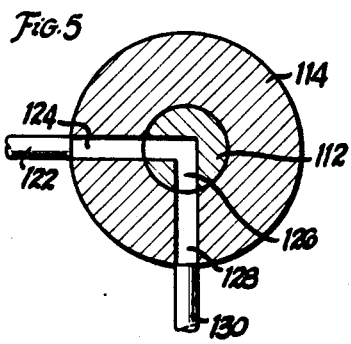
Figure 6:
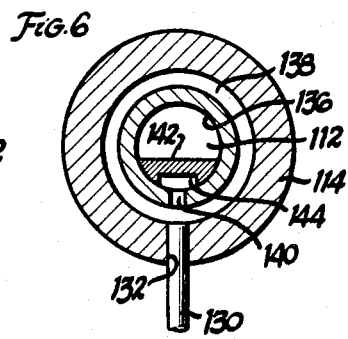
Figure 7:
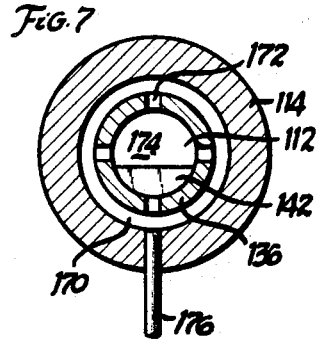

In the drawings:
FIGURE 1 is a schematic diagram, partially in cross section, of one form of speed sensing device embodying the present invention;
FIGURE 2 is a cross sectional view taken on line 2—2 of FIGURE 1;
FIGURE 3 is a cross sectional view taken on line 3—3 of FIGURE 1;
FIGURE 4 is a schematic diagram, partially in cross section, of another embodiment of the invention;
FIGURE 5 is a cross sectional view taken on line 5—5 of FIGURE 4;
FIGURE 6 is a cross sectional view taken on line 6—6 of FIGURE 4; and
FIGURE 7 is a cross sectional view taken on line 7—7 of FIGURE 4.

In the embodiment of FIGURE 1, the invention is shown in a system where the rotary speed of an engine driven shaft is to be held constant in situation where the load driven by the engine may be varied. In FIGURE 1, a variable speed engine is schematically illustrated at 10 and, in operation, drives a shaft 12 in rotation at a rotational speed proportional to the engine speed. A cam 14 is fixedly mounted upon shaft 12 to drive a piston 16 in vertical reciprocation, the frequency of reciprocation of the piston being directly proportional to the rotary speed of shaft 12. The lower end of piston 16 carries a foot or follower 18 which is resiliently biased against cam 14 by a compression spring 20 which acts between follower 18 and the lower side of a fixedly mounted chamber 22.

Chamber 22 is formed with a cylinder 24 within which piston 16 is reciprocated and also includes a storage chamber 26 externally of cylinder 24 which communicates with the interior of cylinder 24 through inlet passages 28. Fluid is supplied to chamber 26 from an elevated reservoir 30 through an inlet conduit 32 so that chamber 26 is completely filled at all times with fluid. In FIGURE 1, piston 16 is shown at the upper limit of its stroke, at which time the upper end 34 of the piston is above openings 28 and communication between reservoir 30 and the interior of cylinder 24 is blocked. When piston 16 is at its lower limit of reciprocation, the upper end face 34 of the piston is located below openings 28 so that fluid can flow from chamber 26 through openings 28 into the interior of cylinder 24 above the piston face. During the upward stroke of piston 16, piston 16 moves upwardly past openings 28 to close the openings and forces a charge or pressure pulse of fluid through an outlet opening 36 into a delay conduit 38. It is apparent that upon rotation of shaft 12, piston 16 is cyclically reciprocated and a continuous series of pressure pulses of fluid are fed into conduit 38, with the frequency of the pulses being directly proportional to the rotary speed of shaft 12.

For reasons which will be discussed more fully below, the length of conduit 38 is chosen to be such that a finite length of time is required for a pressure pulse to be transmitted through conduit 38 from outlet 36 to an inlet port 40 of a pulse dividing means 42.

The end of delay conduit 38 is connected to inlet port 40 of pulse dividing assembly 42 which takes the form of a valve assembly having a stationary housing 44 and a rotary valve member 46 of generally cylindrical shape mounted for rotation within a bore 48 in housing 44. Valve member 46 is driven in rotation within housing 44 by shaft 12 which is connected through an angularly variable coupling assembly 50 to a stub shaft 52. A bevel gear 54 is fixed upon stub shaft 52 and meshed with a second bevel gear 56 which is fixedly coupled to valve member 46. Thus, upon rotation of shaft 12, valve member 46 is driven in rotation within housing 44 at a speed proportional to and synchronized with the rotary speed of shaft 12. In the particular embodiment shown in the drawings, bevel gears 54 and 56 have a one-to-one ratio so that the rotary speed of valve member 46 is exactly the same as that of shaft 12. Coupling 50 is for the purpose of angularly adjusting shaft 52 relative to shaft 12 to vary the rotative phase relationship between shaft 12 and valve member 46 and provides a positive coupling between the two shafts.

Referring now to FIGURE 2, valve member 46 is formed with an annular passage 58, 60 axially aligned with inlet port 40 and extending approximately 180° around the circumference of valve member 46. This annular passage is split into two sections 58 and 60 by a radially projecting dividing lip 62. A branch passage 64 (FIGURE 1) extends axially upwardly from passage 58 to axially overlap an annular passage 66 which extends around the circumference of bore 48 in housing 44. Passage 66 is connected to a first outlet port 68 in housing 44.

A second axial passage 70 is formed in the periphery of valve member 46 to extend downwardly from passage 60 to axially overlap a second annular groove 72 which extends around the circumference of bore 48 and communicates with a second outlet port 74 in housing 44.

Outlet ports 68 and 74 are respectively connected, by conduits 76 and 78 (FIGURE 1) to opposite ends of the cylinder 80 of a differential motor. One-way check valves schematically indicated at 82 permit the flow of fluid from conduits 76 and 78 into the interior of cylinder 80, but prevent fluid from flowing from the interior of the cylinder back into the conduits 76 and 78. A piston 84 is slidably mounted in the interior of the cylinder 80 and its piston rod 86 is coupled to the throttle of engine 10 to position the throttle in accordance with the position of piston 84 within cylinder 80.

Pressure is bled from opposite sides of piston 84 through restricted orifices 88 and 90 connected by respective conduits 92 and 94 to ports 96 and 98 in valve housing 44. Axial grooves of limited circumferential extent at 100 and 102 in valve member 46 axially overlap ports 96 and 98 respectively and communicate with an annular groove 104 which extends around the circumference of valve member 46. Groove 104 is axially aligned with an outlet port 106 which communicates, via conduit 108 with reservoir 30. In this manner, pressure from opposite sides of piston 84 in cylinder 80 is cyclically bled to return the fluid to reservoir 30.

Operation of the embodiment described above is as follows. With piston 84 at the position shown in FIGURE 1, engine 10 is driven at a constant speed determined by the position of the engine throttle which in turn is determined by the position of piston 84. Operating at a constant speed, engine 10 drives shaft 12 at a constant rotary speed. Cam 14 drives piston 16 in one reciprocatory cycle of a complete upward stroke and a complete downward stroke for each revolution of shaft 12.

Rotation of shaft 12, as explained above, also drives the rotary valve element 46 in rotation within housing 44, the drive train including the coupling 50 and bevel gears 54 and 56. With a one-to-one ratio in the meshing bevel gears 54 and 56, valve element 46 turns one complete revolution for each revolution of shaft 12.

With the foregoing relationships, piston 16 feeds a pressure pulse into outlet 36 for each revolution made by shaft 12. Because of the length of conduit 38, a finite time elapses between the feeding of the pulse into the inlet end of conduit 38 and the arrival of the pulse at inlet port 40 of pulse dividing assembly 42. The time of transit of the pulse from outlet 36 to inlet 40 is determined by the length of the delay line or conduit 38 and the physical properties of the particular fluid employed.

The pulse dividing assembly 42 is initially adjusted so that if engine 10 continues to operate at constant speed, the pulse will arrive at inlet 40 at the particular time in the rotative cycle of member 46 that dividing lip 62 is essentially in the middle of inlet port 40. This initial adjustment is initially made by coupling 50, by means of which the angular relationship of dividing lip 62 to cam 14 may be varied.

If, the position of lip 62 in essentially the middle of port 40 coincides with the arrival of a pressure pulse, the incoming pulse is equally divided, half of the pulse flowing into passage 58 and half of the pulse flowing into passage 60. Passage 58 communicates with outlet port 68, while passage 60 communicates with outlet port 74 and hence if the pulse is equally divided, the total pressure carried by the incoming pulse is applied equally to opposite sides of piston 84 and the piston remains stationary.

Assuming now that a load is applied to engine 10 which causes the shaft 12 to begin to slow down, the time required for transit of a pulse through conduit 38 remains constant. However, because the shaft 12 is slowing down, the period of time required for a complete revolution of valve member 46 increases, by virtue of the slowing of the shaft 12. Thus, at the time of arrival of the pulse, the dividing lip 62 will not have reached the center of port 40 and, assuming a clockwise direction of rotation of member 46 as indicated in FIGURE 2, a greater portion of the pulse will flow into passage 60 and the remaining lesser portion will flow into passage 58. Thus, a greater volume of fluid under pressure will pass through passage 70 and outlet port 74 to the rod side of piston 84, while a reduced quantity of fluid will be conducted to the head side of piston 84. This will cause piston 84 to elevate as viewed in FIGURE 1 and this elevating movement of the piston is transmitted by its piston rod 86 to the engine throttle in a direction tending to increase the fuel supply to the engine and thus restoring the prior engine speed.

If engine 10 should overspeed, dividing lip 62 will have moved beyond the midpoint of port 40 when the pulse arrives, and a greater portion of the incoming pulse will be transmitted to the space above piston 84, thereby driving the piston downwardly to slow down the engine.

A spring 80a may be employed to (1) establish an initial rest position of piston 84 for starting and (2) to establish a definite fuel setting or throttle position versus engine speed (droop). Without spring 80a the characteristic is that of an isochronous governor—i.e. the system will operate to create a balanced pressure across the piston at any position of the piston.

A second form of the invention is shown in FIGURES 4 through 7. In this embodiment, an engine 110 having a variable speed control is connected to drive a shaft 112 in rotation. Shaft 112 is journalled for rotation within a fixed housing 114. A pump 116 has its intake 118 connected to a fluid reservoir and the outlet of the pump is connected through an accumulator 120 and conduit 122 to an inlet port 124 in housing 114. As best seen in the cross sectional view of FIGURE 5, a right angled bore 126 is formed in shaft 112 to place inlet port 124 in communication wiht an outlet 128 in housing 114 when the opposite ends of right angle bore 126 are aligned with ports 124 and 128. This arrangement is analogous to the reciprocating piston 16 of the FIGURE 1 embodiment, and it is apparent that upon rotation of the engine driven shaft 112, the passage 126 conducts a pressure pulse from the steady pressure applied at inlet 124 into outlet 128 for each complete revolution of shaft 112.

A delay conduit 130 is connected at one end to outlet 128 and connected at its opposite end to an inlet port 132 in housing 114.

At the left hand end of housing 114, a speed adjustment sleeve 134 is rotatively journalled in housing 114, an internal bore 136 in the interior of the sleeve rotatably receiving the extreme left hand end of shaft 112. A first annular groove 138 in the outer periphery of sleeve 134 is axially aligned with inlet port 132, the groove 138 extending around the entire outer periphery of sleeve 134, as best seen in FIGURE 6. A single bore 140 passes through the wall of sleeve 136 and is axially overlapped by a projection 142 at the extreme left hand end of shaft 112. An axial groove 144 extends from projection 142 back along shaft 112 to axially overlap both bore 140 and an annular groove 146 recessed into the bore 148 in housing 114 within which shaft 112 is journalled for rotation. Groove 144 and port 140 constitute the pulse dividing means of this embodiment.

Groove 146, as best seen in FIGURE 4, communicates via an outlet port 150 with a conduit 152 connected into the head space of a single acting differential motor 154. A one-way check valve 156 is mounted in outlet 150 to prevent the flow of fluid under pressure from conduit 152 back into annular groove 146. Motor 154 includes a piston 158 which is biased by a spring 160 toward the head end of the cylinder of motor 154. The head space within the cylinder of motor 154 is continuously vented through a restricted orifice 162 and a return line 164 to a reservoir 166 which supplies the intake of pump 116. The piston rod 168 of motor 154 is connected to the throttle of engine 110 to control the engine speed in accordance with the position of piston 158.

Adjustment sleeve 134 is also formed with a second annular groove 170 which extends around the entire periphery of the sleeve and communicates with the interior of the sleeve through a plurality of bores such as 172. Thus, the chamber 174 within bore 136 to the left of the left hand end of shaft 112 is in continuous communication with a vent line 176 via the bores 172 and groove 170.

Assuming that engine 110 is driving at a constant speed, shaft 112 is driven at a constant speed of rotation. A constant pressure is continuously applied at inlet port 124 by pump 116 via accumulator 120 and once during each revolution of the shaft, the ends of right angle passage 126 in shaft 112 line up with ports 124 and 128 to permit a pulse of pressure to flow into the delay line 130. Referring now particularly to FIGURE 6, projection 142 and passage 144 are fixed to shaft 112 and rotate continuously within bore 136. When port 140 is fully or partially exposed to passage 144 during the arrival of a presure pulse, all or a portion of the arriving pulse can flow from delay line 130 through port 132 and port 140 into passage 144. From passage 144, the pulse flows into annular passage 146, past check valve 156 and into the head space of motor 154. Pressure is continuously bled from the head space through orifice 162 at a substantially constant rate, and as long as pressure pulses of equal magnitude are fed into the chamber of motor 154, an equilibrium will be reached and maintained between the pressure in the head space of motor 154 and the opposing force of biasing spring 160, thus positioning piston 158, its piston rod 168 and the engine throttle at a definite position.

It should be noted that any residual pressure in delay line 130 and annular groove 138 will be vented into chamber 174 after projection 142 has rotated clear of port 140.

In the embodiment of FIGURES 4 through 7, the pulse dividing means constituted by port 140 and groove 144 functions to divide the incoming pulse by permitting only a portion of the pulse, under normal circumstances, to be transmitted, while the remaining portion of the pulse is blocked. This division of the pulse is accomplished by setting speed adjustment 134 in a rotative position such that the leading side of groove 144 partially blocks port 140 at the time of arrival of the pulse. The rotatively leading side portion of groove 144 acts as a shutter which varies the effective area of port 140 available for the incoming pulse to pass through into groove 144 and thence to the chamber of motor 154. Assuming that engine 110 slows down upon the application of a load, the change in speed of shaft 112 during the time of propagation of a pulse through delay conduit 130 causes the leading side edge of groove 144 to pass across port 140 at a slightly later time, thereby decreasing the area of port 140 through which the pulse can pass.

Slowing down of shaft 112 therefor, results in a smaller portion of each pulse to pass to the chamber of motor 154 thus permitting spring 160 to move piston 158 to the left as viewed in FIGURE 4. Leftward movement of piston 154 is employed to increase the speed of engine 110.

Should the engine over speed, the increased speed of shaft 112 opens port 140 at an earlier point in the cycle, thus increasing the amount of pressure transmitted to the chamber of motor 154.

The portion of the pressure pulse which does not pass into groove 144 is reflected by the projection 142 at the time at which the leading edge of the groove 144 has not as yet fully cleared port 140. The pressure pulse is subsequently vented into chamber 174 after projection 142 has rotated clear of port 140.

Speed adjustment 134 may be manually rotated to a selected position of angular adjustment which likewise serves to vary the relationship of port 140 to the rotative cycle of groove 144. The position of speed adjustment 134 adjusts the rotative phase relationship between the pulse dividing means and shaft 112 to function both as a speed selector and also as a manual override control.

While both embodiments as disclosed show a single pulse generator connected to an individual pulse dividing means, both embodiments may be employed in systems where a single pulse generator is connected to feed pulses to several pulse dividing means, each dividing means being driven by its individual drive unit. In a system of this type, several engines, generators or other units may be individually controlled and/or synchronized with each other. Load distribution could thus be automatically equalized without requiring matching of the characteristics of the individual governors and control units.

Further, in some systems it may be possible to employ an existing component of the unit as a source of pressure pulses as in the case of an injection pump.

While two embodiments of the invention have been described in detail, it will be apparent to those skilled in the art that either embodiment is capable of a wide variety of modification as to the arrangement, disposition and form of the parts or/and combination of the basic elements without departing from the principles of the present invention. Therefore, the foregoing description is to be considered exemplary rather than limiting, and the true scope of the invention is that defined in the following claims.

I claim:

1. The method of generating a signal representative of a variation in the speed of a driven shaft comprising the steps of generating a series of pressure pulses at a frequency proportional to the speed of the shaft, feeding the pulses through a conduit of a length such that a finite length of time is required for the pulse to traverse the conduit, cyclically moving a pulse dividing member laterally across the pulse receiving end of said conduit in cyclic movement synchronized with the speed of the shaft to conduct a portion of the pulse from said receiving end of said conduit to an outlet, the magnitude of said portion of said pulse being determined by the position of said dividing member laterally of said pulse receiving end of said conduit at the time of arrival of said pulse whereby said portion of said pulse defines a signal representative of the shaft speed.

2. For use in combination with a cyclically movable driven member, variable speed drive means coupled to said member to drive said driven member in cyclic movement, and control means actuable to control said drive means to vary the speed of cyclic movement of said driven member; speed sensing means comprising a conduit, pulse means for feeding a continuous series of pressure pulses into said conduit at a frequency proportional to the cyclic frequency of movement of said driven member, said conduit being of a length such that a finite length of time is required for a pulse to traverse said conduit, pulse dividing means having an inlet connected to said conduit and outlet means, a pulse dividing member in said dividing means having passage means for transmitting pressure pulses to said outlet means and having a passage opening movable laterally across the inlet of said dividing means, means for driving said dividing member in cyclic movement synchronized with the speed of cyclic movement of said driven member to move said passage opening laterally across said inlet opening of said dividing means during a portion only of each cycle, and pressure responsive means connected to said dividing means for actuating said control means.

3. The invention defined in claim 2 wherein said outlet means comprises a pair of outlet passages, said pressure responsive means comprises a differential pressure responsive member, one of said outlet passages being connected to apply pressure urging said differential pressure responsive member in one direction and the other outlet passage being connected to apply pressure urging said differential pressure responsive member in the opposite direction, said laterally movable passage opening having a dividing lip therein for dividing a pressure pulse and feeding the divided portions respectively to said outlet passages in accordance with the position of the lip laterally of said opening of said dividing means at the time of arrival of a pulse at said opening of said dividing means.

4. The invention defined in claim 2 wherein said pressure responsive means comprises a movable output member spring biased in a first direction, said outlet means being connected to conduct pulses to said pressure responsive means to urge said output member in the opposite direction, restricted orifice vent means for venting pressure from said pressure responsive means, and means for adjusting the degree of overlap of said laterally movable passage opening and said dividing means opening at the time of arrival of a pulse to thereby adjust the magnitude of the portion of the pulse transmitted to said pressure responsive means.

5. The invention defined in claim 2 wherein said pulse means comprises a reciprocatory piston, and cam means on said driven member for driving said piston in reciprocation.

6. The invention as defined in claim 2 wherein said pulse means comprises a pressure source, and passage means in said driven member for connecting said pressure source to said conduit during a limited portion only of each cycle of movement of said driven member.

7. The invention defined in claim 2 further comprising means for venting said pressure responsive means through a restricted orifice during a portion of each cycle of movement of said driven member.

8. The invention defined in claim 2 wherein said pulse dividing member comprises a valve member mounted for rotation within a housing, and said means for driving said dividing member comprising means for driving said valve member at a cyclic frequency proportional to that of the driven member.

9. The invention as defined in claim 8 further comprising means for varying the cyclic phase relationship between the driven member and said valve member.

10. The invention defined in claim 2 wherein said pulse dividing member comprises a valve member mounted for rotation within a sleeve member, said sleeve member being rotatably movable and having an opening connected by passage means to the inlet of said pulse dividing means, said opening feeding the pressure pulse in adjustable phase relationship to said valve member.

11. For use in combination with a cyclically movable driven member, variable speed drive means coupled to said member to drive said driven member in cyclic movement, and control means actuable to control said drive means to vary the speed of cyclic movement of said driven member; speed sensing means comprising a conduit, pulse means for feeding a continuous series of pressure pulses into said conduit at a frequency proportional to the cyclic frequency of movement of said driven member, pulse dividing means connected to said conduit at a location such that a finite length of time is required for a pulse to traverse said conduit from said pulse means to said pulse dividing means, pressure responsive means connected to said pulse dividing means, a pulse dividing member in said pulse dividing means having passage means for selectively transmitting the pressure pulses from said conduit to said pressure responsive means, means for driving said dividing member in cyclic movement synchronized with the speed of cyclic movement of said driven member to expose said passage means to said conduit during a portion only of each cycle to thereby transmit a portion of a pulse to said pressure responsive means determined by the relative position of said passage means and said conduit at the time of arrival of the pulse at said pulse dividing means.

12. The invention as defined in claim 11 further comprising means for changing the relative position of said passage means and said conduit means.

References Cited

UNITED STATES PATENTS

| | | | |
|---|---|---|---|
| 3,028,847 | 4/1962 | Sterner | 137—36 X |
| 3,180,088 | 4/1965 | Swain | 137—36 X |
| 3,228,408 | 1/1966 | Young | 137—36 X |
| 3,233,522 | 2/1966 | Stern | 137—36 X |
| 3,260,271 | 7/1966 | Katz | 137—36 |

CLARENCE R. GORDON, *Primary Examiner.*